Nov. 12, 1957  H. A. MOULTHROP  2,813,022
METHOD OF CONDUCTING A PERSON BETWEEN A SAFE
REGION AND A DANGEROUS REGION
Filed Feb. 28, 1956  3 Sheets-Sheet 1

INVENTOR.
Homer A. Moulthrop
BY
Roland A. Anderson
Attorney

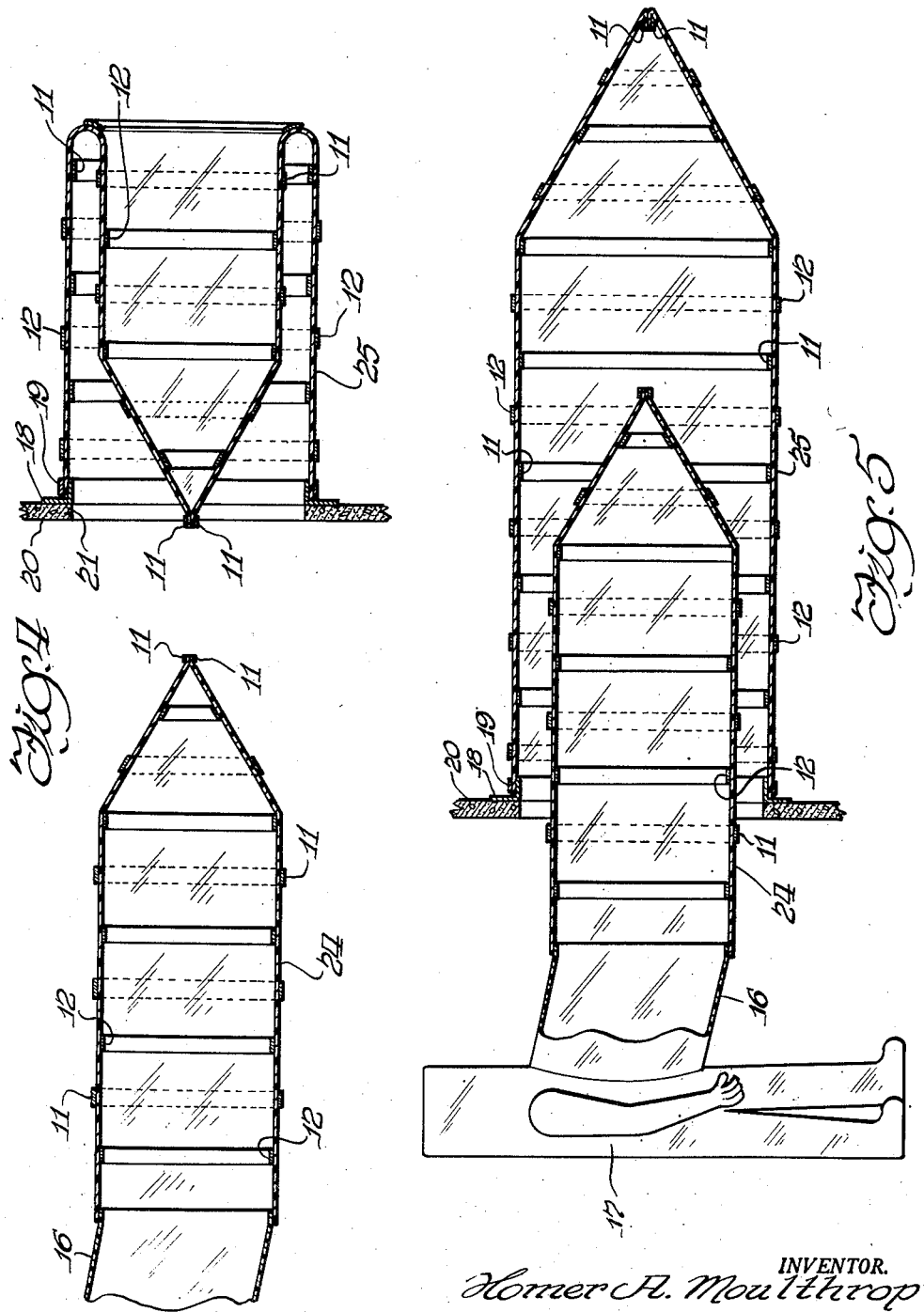

Nov. 12, 1957  H. A. MOULTHROP  2,813,022
METHOD OF CONDUCTING A PERSON BETWEEN A SAFE
REGION AND A DANGEROUS REGION
Filed Feb. 28, 1956  3 Sheets-Sheet 3
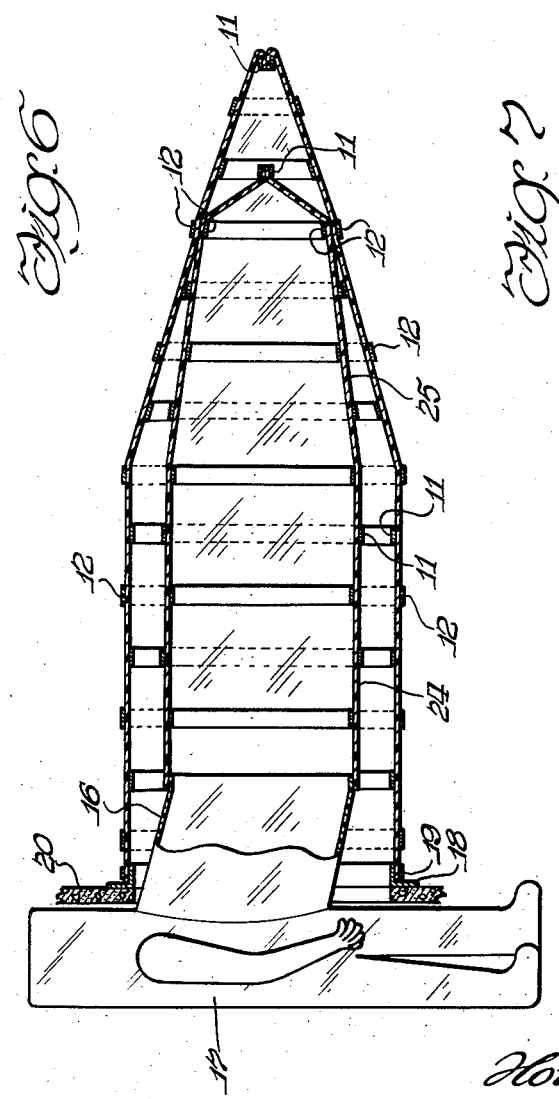
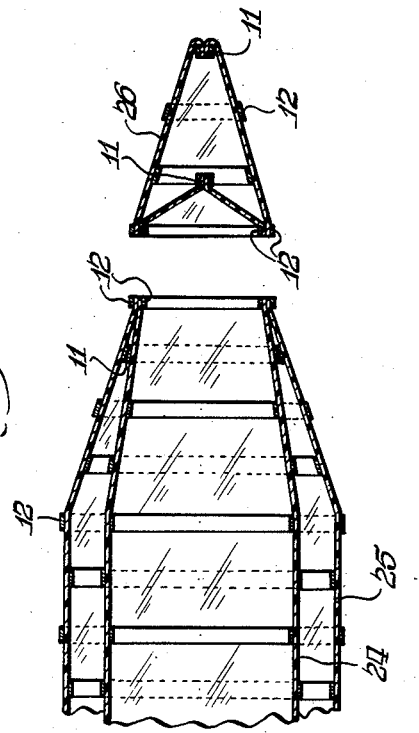
INVENTOR.
Homer A. Moulthrop
BY
Roland A. Graham
Attorney United States Patent Office 2,813,022
Patented Nov. 12, 1957

2,813,022

METHOD OF CONDUCTING A PERSON BETWEEN A SAFE REGION AND A DANGEROUS REGION

Homer A. Moulthrop, Richland, Wash., assignor to the United States of America as represented by the United States Atomic Energy Commission Application February 28, 1956, Serial No. 568,414

2 Claims. (Cl. 2—2)

This invention relates to a method for conducting a person between a safe region and a dangerous or contaminated region so that he may work in the dangerous region without risk to himself and without contaminating the safe region.

The invention makes use of thermoplastic material that may be easily sealed by bonding to itself and may be easily torn for separation or opening up of parts.

According to the present invention, a safety suit in which a person is to work in a dangerous region is connected with a hole in a wall separating the dangerous region by a thermoplastic tube that is turned partially inside out. The tube is sealed by pressure and separated into two parts at the seal, whereupon the person in the safety suit may move around freely in the dangerous area. Thereafter the parts of the tube are resealed, and a portion of the tube is removed at the seal, whereupon the person may exit through the tube into the safe region. The application of strips of masking tape to predetermined regions of the tube inside and out simplifies the pressure sealing of the tube at desired regions.

In the drawings:

Fig. 4 is a sectional view of the tube after sealing and severing operations have been performed on it;

Fig. 5 is a sectional view, partly in elevation, showing parts of the tube being brought together for resealing;

Fig. 6 is a sectional view, partly in elevation, showing the parts of the tube after they have been resealed; and Fig. 7 is a sectional view showing the resealed tube after a severing operation has been performed on it.

Figures 1, 2:
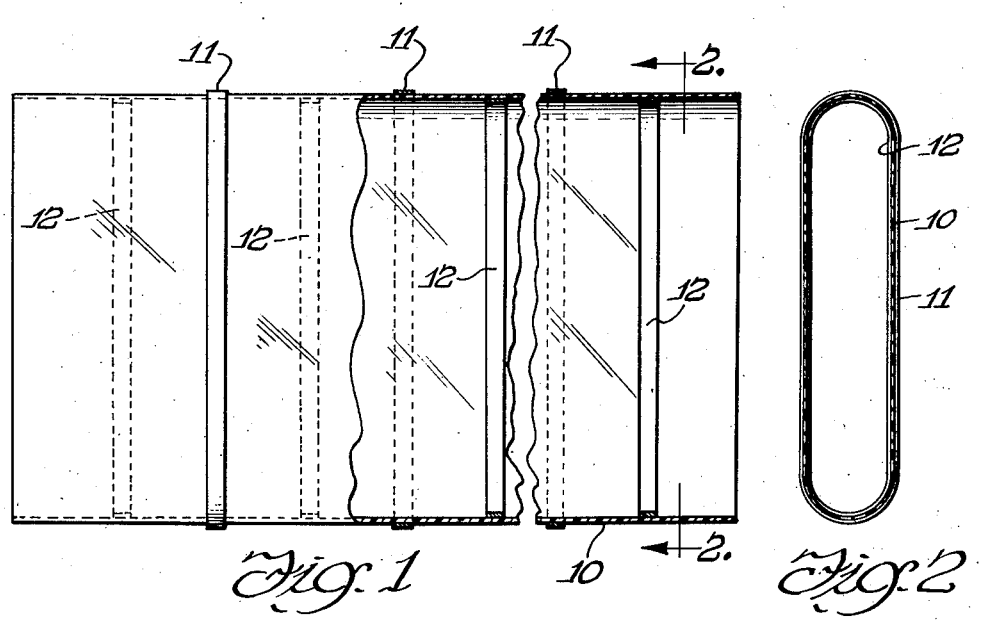
Fig. 1 is an elevational view, partly in section, of a thermoplastic tube used in the present invention.
Fig. 2 is a sectional view taken on the line 2—2 of Fig. 1.

As shown in Figs. 1 and 2, a tube 10 is provided which is formed of a sheet of thermoplastic material such as polyethylene or vinylite, the edges of the sheet being overlapped and bonded to one another by the application of heat and pressure. The heat may come from the tool that applies the pressure, or dielectric heating may be employed. The heat used in the various sealing operations that are to be described presently may be produced in either of these ways. The tube 10 is provided with circumferential strips 11 and 12 of masking tape formed of materials such as paper or cloth. The strips 11 are affixed to the exterior surface of the tube 10, and the strips 12, to the interior surface thereof, the strips 11 alternating with the strips 12, and the spacing between the strips being equal. The strips 12 may be applied exteriorly of the tube 10 before it is turned inside out to the condition depicted in Figs. 1 and 2. Then the strips 11 may be applied exteriorly to the tube 10 when it is in the condition of Figs. 1 and 2.

Figure 3:
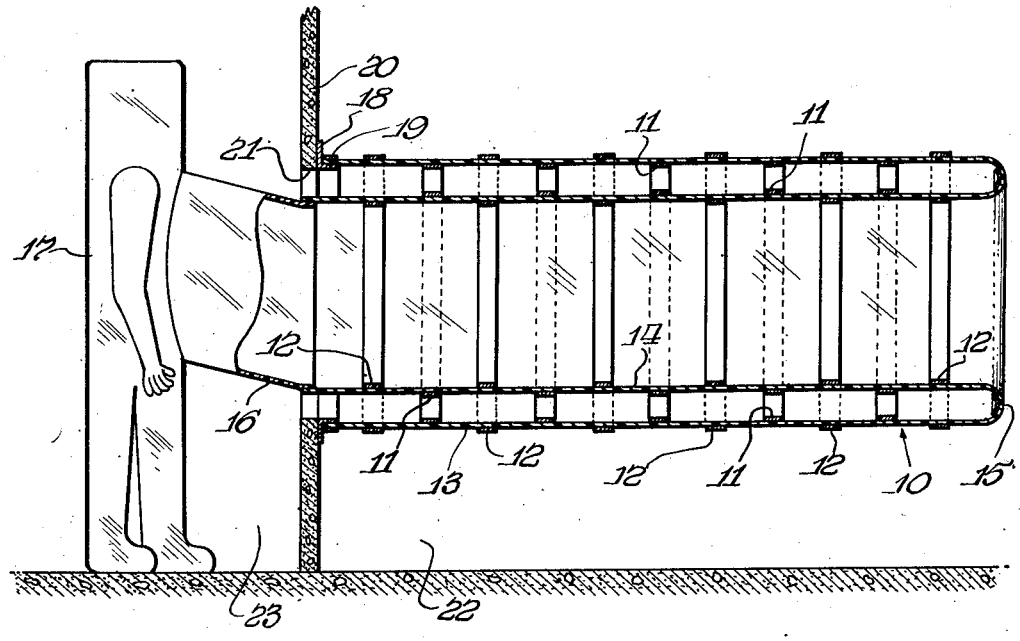
Fig. 3 is a sectional view, partly in elevation, illustrating the connection of the tube to a safety suit and a wall separating safe and dangerous regions.

Now, as shown in Fig. 3, the tube 10 is turned partially inside out so as to be transformed into an outer section 13 and an inner section 14 joined thereto by a fold 15 having one of the strips 11 at its inside. Thus the remaining strips 11 become outside strips on the inner section 14 and inside strips on the outer section 13, these outside and inside strips lying directly opposite one another and coming into contact when the sections 13 and 14 come into contact. Moreover, the strips 12 become inside strips on the inner section 14 and outside strips on the outer section 13, these inside and outside strips lying directly opposite site one another.

The end of the inner section 14 is suitably sealed to a tubular flange 16 on a safety suit 17, which may be formed at least in part of thermoplastic material and is adapted to house a person, the suit being provided, for example, with legs, arms, and gloves. The end of the outer section 13 is suitably sealed, by being held between an annular flange 18 and a clamping ring 19, to a wall 20 around a hole 21 therein. The wall 20 separates a safe region 22 from a dangerous region 23. The safety suit 17 is in the dangerous region 23, and the outer and inner sections 13 and 14 of the tube 10 project, respectively, from the wall 20 and the tubular flange 16 of the safety suit 17, into the safe region 22. Now the person enters the suit 17 through the sections 13 and 14.

Now pressure and heat are applied to the outer and inner sections 13 and 14 of the tube 10 at that inside strip 11 on the outer section 13 and at that outside strip 11 on the inner section 14 which are nearest the fold 15 to collapse the sections 13 and 14 at these strips 11 and to bring about contact between the opposing portions of the interior of the inner section 14 at these strips 11 and a juncture or seal between these portions. Since pressure is applied at these strips 11, no bonding takes place between the outer and inner sections 13 and 14.

Next, as shown in Fig. 4, the tube 10 is turned further inside out so that the juncture or seal formed in the inner section 14 is moved through the hole 21 in the wall 20, whereupon the person in the safety suit 17 severs the tube 10 at the juncture so as to transform the tube 10 into two separate tubular parts 24 and 25 sealed at one end, respectively, to the tubular flange 16 of the safety suit 17 and the wall 20 and sealed shut at the other end. Thus the tubular part 24, being separate from the tubular part 25 and sealed shut at one end, protects the person in the suit 17 and permits him to move about in the dangerous region 23. The tubular part 25, being sealed shut at one end, closes off the safe region 22 from the dangerous region 23. The person in the safety suit 17 may be supplied with air through a pipe, not shown, leading to the suit or by an air supply built into the suit.

When the person in the safety suit 17 wishes to return to the safe region 22, he maneuvers so as to introduce the tubular part 24 into the tubular part 25, as shown in Fig. 5, until the outside strips 11 and the inside strips 12 on the tubular part 24 are brought opposite the inside strips 11 and the outside strips 12, respectively, on the tubular part 25. Then pressure and heat are applied to the tubular parts 24 and 25 at the regions shown in Fig. 6 to be in contact with one another, more particularly, at the location of one outside strip 12 on the tubular part 25 and the juxtaposed inside strip 12 on the tubular part 24, so that the tubular parts 24 and 25 are collapsed at these regions and a juncture or seal is formed here between the tubular parts. The inside tape 12 here on the tubular part 24 prevents a seal from being formed across the interior of the tubular part 24.

Now the tubular parts 24 and 25 are severed at the seal just formed so that, as shown in Fig. 7, an enclosure 26, composed of the closed ends of the tubular parts 24 and 25, is removed from them, leaving them open, so that the person can exit through them from the safety suit 17 to the safe region 22. The open ends of the tubular parts 24 and 25 remain sealed to one another so that contamination cannot go through the hole 21 from the dangerous region 23 to the safe region 22. The enclosure 26 constitutes a trap for contamination that may have reached the interior of the closed end of the tubular part 25.

If further work is to be done in the dangerous region 23, the person may reenter the suit 17 through the tubular parts 24 and 25. Joined as they are in a seal at their open ends, the tubular parts 24 and 25 correspond to the inner and outer sections 14 and 13 of the tube 10 of Fig. 3. Thus the outside strip 12 on the outer tubular part 25 lie opposite the inside strips on the inner tubular part 24, and the inside strips 11 on the outer tubular part 25 lie opposite the outside strips 11 on the inner tubular part 24, as is the case with the strips on the outer and inner sections 13 and 14. Accordingly, heat and pressure may be applied to the tubular parts 25 and 24 at any two juxtaposed strips 11, for example, those next to the open ends of the tubular parts 25 and 24, so that new tubular parts 25 and 24 are produced with closed ends that are severed from one another as shown in Fig. 4.

Dimensions are not critical to the process of the present invention, but it may be noted that this process has been successfully carried out with strips 11 and 12 of 2 or 3 inch width and a spacing of 6 to 10 inches of the strips on the same side of the tube 10.

It will be understood that the drawings distort the tube 10 for the sake of better illustration. In Fig. 3 the inner section 14 is not smaller in diameter than the outer section 13, but is shown smaller so that both sections 14 and 13 can be clearly illustrated. Similarly, in Figs. 4 to 7 the inner tubular section 24 is not smaller in diameter than the outer tubular section 25.

The intention is to limit the invention only within the scope of the appended claims.

What is claimed is:

1. A method of providing for safe transfer of a person between a safe region and a safety suit in a dangerous region through a hole in a wall separating the safe region from the dangerous region, said method comprising providing a thermoplastic tube having circumferential strips of masking tape affixed in spaced relation alternately to the inner and outer surfaces thereof, turning the tube partially inside out so as to transform the same into an outer section and an inner section extending through the outer section and connected therewith by a fold having one of the strips on its inside and to cause outside strips and inside strips on the outer section to lie opposite inside strips and outside strips, respectively, on the inner section, attaching the end of the outer section to the wall around its hole and the end of the inner section to the safety suit so as to cause the inner and outer sections to protrude into the safe region, applying pressure to the sections at that inside strip on the outer section and that outside strip on the inner section nearest the fold between the sections so as to produce a juncture at the inner section only sealing off from one another the portions of the inner section on opposite sides of the aforementioned outside strip on the inner section, turning the tube further inside out so as to bring the juncture through the hole in the wall and outside the outer section, severing the tube at the juncture into a first tubular part closed at one end and joined at the other end to the wall and into a second tubular part closed at one end and joined at the other end to the suit, whereby the person may move freely in the dangerous region while being protected by the closed end of the second tubular part and the safe region is protected by the closed end on the first tubular part, inserting the second tubular part through the hole in the wall and into the first tubular part to juxtapose an outside strip on the first tubular part and an inside strip on the second tubular part, applying pressure to the tubular parts at said outside and inside strips to produce a juncture only between the interior of the first tubular part and the exterior of the second tubular part, and severing the tubular parts at the juncture to remove the closed ends therefrom, whereupon the person may safely exit from the suit through the second tubular part into the safe region.

2. A method of providing for safe transfer of a person between a safe region and a safety suit in a dangerous region through a hole in a wall separating the safe region from the dangerous region, said method comprising providing a thermoplastic tube having circumferential strips of masking tape affixed in spaced relation alternately to the inner and outer surfaces thereof, turning the tube partially inside out so as to transform the same into an outer section and an inner section extending through the outer section and connected therewith by a fold having one of the strips on its inside and to cause outside strips and inside strips on the outer section to lie opposite inside strips and outside strips, respectively, on the inner section, attaching the end of the outer section to the wall around its hole and the end of the inner section to the safetly suit so as to cause the inner and outer sections to protrude into the safe region, applying pressure to the sections at an inside strip on the outer section and that outside strip opposite the said inside strip so as to produce a juncture at the inner section only sealing off from one another the portions of the inner section on opposite sides of the aforementioned outside strip on the inner section, severing the tube at the juncture into a first tubular part closed at one end and joined at the other end to the wall and into a second tubular part closed at one end and joined at the other end to the suit, whereby the person may move freely in the dangerous region while being protected by the closed end of the second tubular part and the safe region is protected by the closed end on the first tubular part, inserting the second tubular part through the hole in the wall and into the first tubular part to juxtapose an outside strip on the first tubular part and an inside strip on the second tubular part, applying pressure to the tubular parts at said outside and inside strips to produce a juncture only between the interior of the first tubular part and the exterior of the second tubular part, and severing the tubular parts at the juncture to remove the closed ends therefrom, whereupon the person may safely exit from the suit through the second tubular part into the safe region.

References Cited in the file of this patent

UNITED STATES PATENTS

| | | |
|---|---|---|
| 2,413,386 | Schulz | Dec. 31, 1946 |
| 2,473,033 | Letac | June 14, 1949 |
| 2,683,262 | Foss | July 13, 1954 |

OTHER REFERENCES

The Evening Star, Newspaper Photograph and Description, January 21, 1954, on file in Division 24.